Aug. 8, 1967     K. H. BRECH     3,334,622
METHOD AND APPARATUS FOR ELECTRO-ACOUSTIC EXPLORATION
Filed Dec. 15, 1964     2 Sheets-Sheet 1
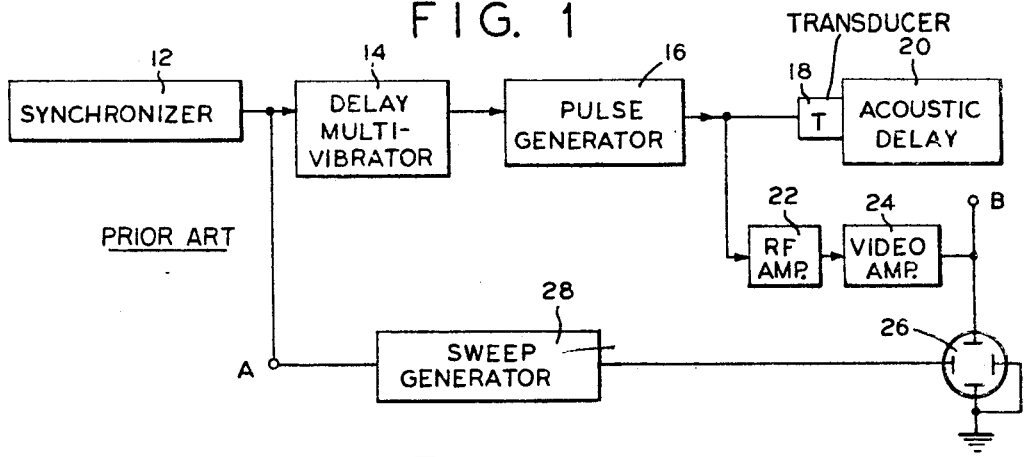
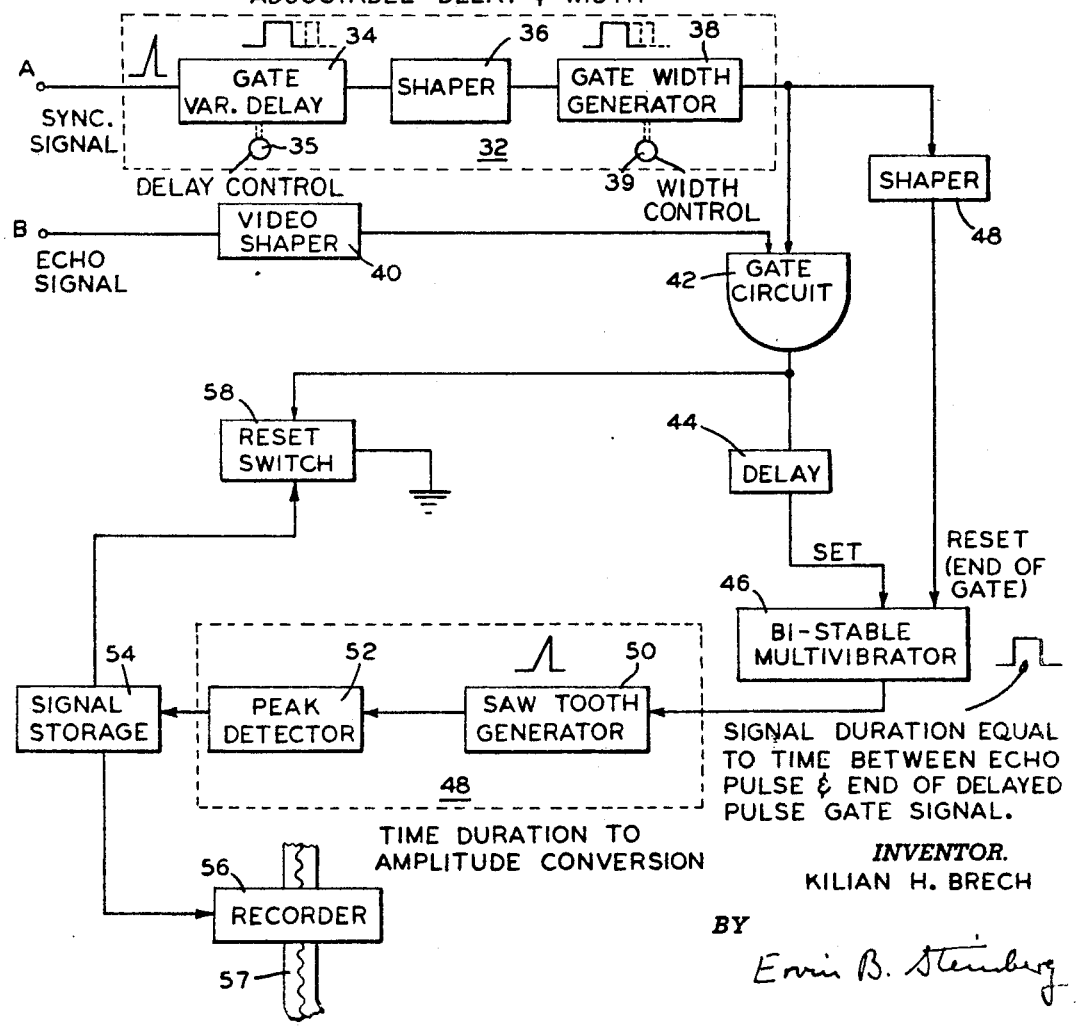
INVENTOR.
KILIAN H. BRECH
BY
Erwin B. Steinberg

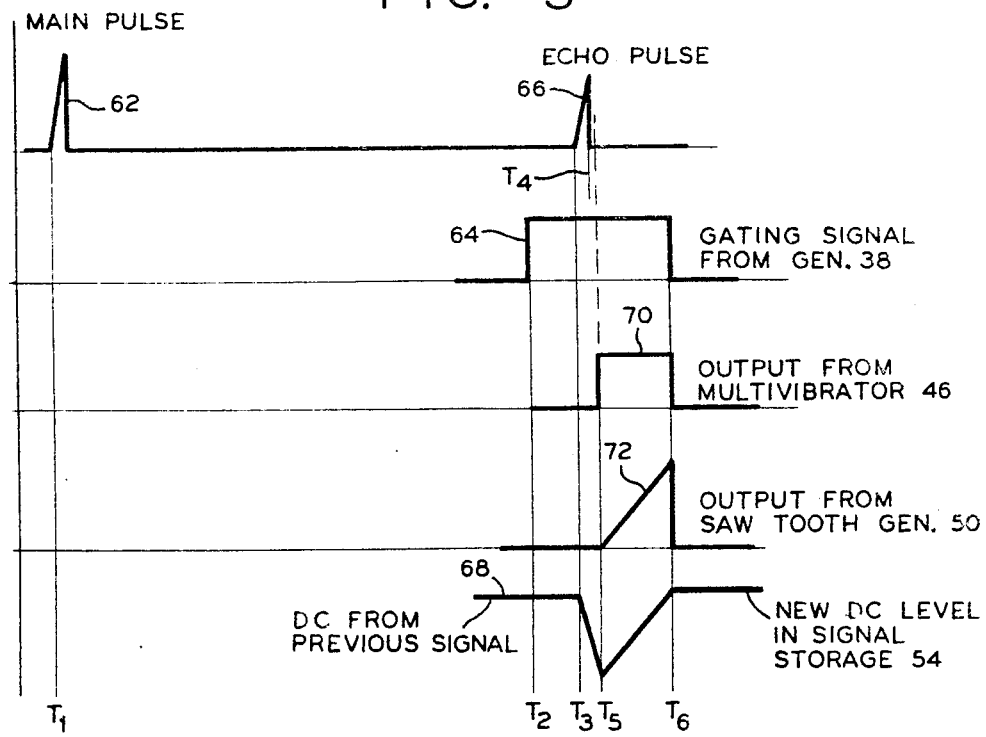
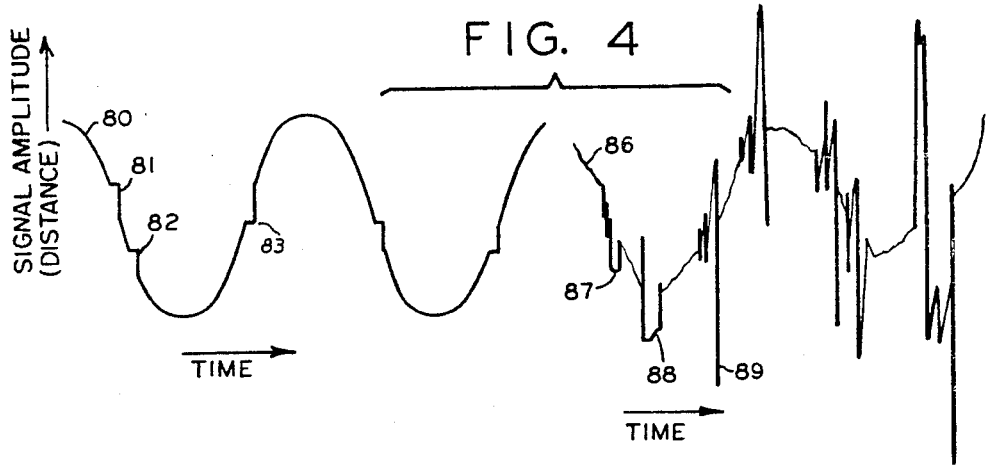

United States Patent Office 3,334,622
Patented Aug. 8, 1967

3,334,622
METHOD AND APPARATUS FOR ELECTRO-ACOUSTIC EXPLORATION
Kilian H. Brech, Norwalk, Conn., assignor, by mesne assignments, to Branson Instruments, Inc., Stamford, Conn., a corporation of Delaware
Filed Dec. 15, 1964, Ser. No. 418,493
21 Claims. (Cl. 128—2)

ABSTRACT OF THE DISCLOSURE

In an ultrasonic exploration device for providing an output signal responsive to the receipt of an acoustic echo signal whose occurrence, responsive to a moving object, varies with reference to a cyclically generated signal pulse, a time analog signal is generated whose value is commensurate with the time span between the receipt of the echo signal and a fixed point in time responsive to the sending of the signal pulse. The signal is stored in a storage means until the receipt of a subsequent analog signal. A large time constant built in the storage means provides that a previously stored signal is maintained substantially constant for a considerable period of time in the event of the absence of a cyclically recurring signal caused by a temporary loss of one or more echo signals.

---

This invention, broadly, refers to a method and apparatus for measuring and recording a cyclically occurring signal whose value is related to the time span between a variable and fixed event. More specifically, this invention has reference to an electro-acoustic exploration method and measuring circuit which involves the periodic generation of a signal pulse and the receipt of a time delayed echo pulse in response to such a signal pulse, such echo pulse being subject to temporary and random disappearance. Quite specifically, this invention concerns an electrical time analog circuit for determining the time duration between the receipt of an echo pulse and a fixed point in time, for converting this time span to a signal whose value is commensurate with such time span and for storing the value of this signal until the arrival of a succeeding signal which is produced by a likewise occurrence of events.

The use of electro-acoustic equipment or ultrasound in medical diagnosis is well known, having been used with increasing frequency during the most recent decade. Generally, this technique comprises the generation of a train of acoustic pulses in the ultrasonic frequency range, the propagation of these pulses in a body which acts as an acoustic delay, and the receipt of echo signals generated by a change in acoustic impedance encountered by the propagation of the initial pulses. This method is well known for the exploration of the human body to determine, for instance, the location of foreign objects, the measurement of bone and other structure and, more recently, for diagnosing the existence of tumors, lesions, and the like. In the examples cited, the parts subjected to acoustic exploration are substantially stationary and do not change to any measurable extent their position during the duration of the test.

Newer developments have shown the desirability and benefits derived from observing and recording the action of moving objects and substances, for instance the motion of the mitral valve. The reciprocating movement of this valve can be observed quite clearly and on a continuing basis by the use of ultrasound using the pulse-echo exploring technique. Thus, the behavior of this valve while in motion can be observed and analyzed, a procedure not possible with X-ray radiography which provides but one or more pictures of the valve's instantaneous position. The cyclic back and forth motion of this valve, as explored by ultrasonic energy, may be observed on an oscilloscope using a time axis display, but more often it is desirable to provide a graphic record in order to study the results of such exploration in a more detailed fashion and to preserve a record for future diagnostic purposes. Additionally, it has been found that the slope of the distance travelled by the valve versus time is of considerable significance and that such information can be evaluated more accurately on a graphic record.

Several problems are encountered in performing measurements of the type indicated hereinabove. Most importantly, due to the motion of the patient, his breathing, the possible skipping of a heart beat and various other inherent internal conditions, one or more echo signals may temporarily disappear and the recorder or oscilloscope will show spurious signals or oscillations which seriously impair and distract from the representation of the actual behavior of the moving object. This brief loss of an echo signal, occurring on a random basis, greatly complicates the accurate measurement and precise exploration of the behavior of the valve or of a similar moving object.

It has been found necessary, therefore, to devise a novel method and apparatus which compensate for a temporary and spurious loss of the echo signal and prevent erratic behavior of the recording and display apparatus. This has been accomplished by firstly fixing the occurrence of an event in time responsive to the propagation of an exploring signal pulse, secondly, sensing the occurrence of the echo pulse which is responsive to the signal pulse and which varies with time resulting from the motion of the object under exploration, thirdly, providing an output signal whose value is responsive to the time span between the fixed event and the receipt of the echo pulse, fourthly recording such output signal, and finally, maintaining the value of the output signal substantially constant for a period of time in the event of a temporary absence of an immediately succeeding signal. In this way, violent excursions and irrelevant signals on the display and/or recording medium are suppressed, and the presentation of prevailing conditions is greatly enhanced.

The physical embodiment of an apparatus for accomplishing the above recited steps most suitably comprises an electronic circuit involving the novel combination and coaction of various elements coupled to the conventional pulse-echo ultrasonic exploration apparatus.

One of the objects of this invention, therefore, is the provision of an improved measuring method for electro-acoustic exploration, avoiding one or more of the limitations of the prior art arrangements.

Another object of this invention is the provision of an improved electrical circuit for use in ultrasonic measurement circuits in which a time variable event occurs, this event being subject to random loss and disappearance.

Another object of this invention is the provision of a novel method and circuit for electro-acoustic exploration systems, particularly for systems which explore objects undergoing cyclic motion relative to a reference point or reference surface.

Still another object of this invention is the provision of an electro-acoustic measurement circuit for providing a signal which is responsive to the time span between a fixed event and a variable event, for temporarily storing such signal until the arrival of a succeeding similar signal, and for energizing a display device in response to the stored signal.

A further object of this invention is the provision of a pulse storage circuit for ultrasonic exploration systems, the storage circuit storing each echo responsive pulse until the receipt of a next succeeding echo pulse, the clearing of the storage circuit in response to the occurrence of such a succeeding pulse, and the provision of a storage system characterized by a long time constant with respect to the pulse recurrence of the ultrasonic exploration system.

A still further object of this invention is the provision of a method and electrical circuit for ultrasonic exploration systems providing a more accurate and realistic display of signals resulting from a moving object and such display being substantially insensitive to a temporary and randomly occurring loss of such signals.

Still other and further objects of this invention will be more clearly apparent by reference to the following description, when taken in conjunction with the accompanying drawings, in which:

FIGURE 1 is a schematic block diagram of a conventional electro-acoustic exploration circuit;

FIGURE 2 is a schematic block diagram of the improvement comprehended by this invention;

FIGURE 3 is a representation of the wave shape of typical signals versus time, and FIGURE 4 is a representation of the recording obtained when exploring a moving object, showing the conditions with and without the circuit per FIGURE 2.

Referring now to the figures, and FIGURE 1 in particular which schematically illustrates a conventional pulse-echo type ultrasonic circuit, numeral 12 identifies a synchronizer which acts as the master clock for the entire apparatus. A delay multivibrator 14, connected to the synchronizer 12, causes a pulse generator 16 to produce short electrical pulses which are transmitted to a transducer 18, the latter transforming the electrical energy received into acoustic energy. The transducer may be of magnetostrictive material, of piezoelectric material, or of any other suitable material generally employed for this purpose. The transducer sends the resulting acoustic signal impulses (compressive wave energy) into a body 20 which acts as an acoustic delay. Any change in acoustic impedance encountered by the signal pulse causes a reflection which manifests itself as an echo pulse discernible at transducer 18. This echo pulse is transformed by the transducer 18 from acoustic energy into electrical energy, is amplified in R-F amplifier 22 and applied via a video amplifier 24 to one set of deflection plates, normally the vertical deflection plates, of a cathode ray tube 26. The horizontal deflection plates of the cathode ray tube are energized from a sweep generator 28 which is also synchronized by being coupled to the synchronizer 12.

In a typical example, the signal pulse generated has a duration of a fraction of one microsecond and occurs 200 times per second.

Circuits of this type are well understood in the art, operating with pulses in the sonic or ultrasonic frequency range and providing a display wherein the distance between the signal pulse and the associated echo pulse is a measure of time and, based on the velocity of sound transmission in the body 20, a measure of distance.

This circuit is normally quite adequate for stationary objects under exploration, that is, the distance of a defect or change in acoustic impedance within the acoustic delay 20 relative to the surface at which transducer 18 is applied does not vary to a substantial degree. It will be apparent, however, that the echo produced by an object which cyclically oscillates back and forth within the acoustic delay body 20 causes an echo signal whose presentation on the cathode ray tube 26 will move back and forth, depending upon the instantaneous distance between the object and the transducer. The surface at which the transducer is positioned acts as the fixed reference. Moreover, of one or more echo pulses are lost or disappear for various reasons, and more significantly, if the medium 20 is a living body, there will occur, and be visible on the indicating device, spurious oscillations or reflections which have no relation to the actual conditions prevailing.

It has been found necessary, therefore, to devise an improved method and apparatus which suppress spurious and irrelevant signals so as to provide a more precise, accurate and clearly discernible presentation of moving objects versus time.

Referring now to FIGURE 2, the output from the synchronizer 12, point A, is applied a first circuit means 32, a time delayed pulse gate signal circuit, which comprises a variable delay gating circuit 34, a shaper circuit 36, and a gate width generator 38. The variable delay gate circuit 34, a multivibrator, is provided with a control 35 to set the width of a pulse gating signal with reference to the occurrence of the synchronizing pulse. The lagging edge of the signal represents, therefore, a signal which is delayed relative to the occurrence of the synchronizing signal. The lagging edge of the signal from the delay gate circuit actuates a gate width generator 38, the width of which is adjustable by means of a control 39 to provide a pulse gating signal which is delayed with respect to the synchronizing signal and, hence, with respect to the signal pulse sent into the acoustic delay 20. The occurrence of this gating signal represents a fixed event in time, that is, fixed with respect to the signal from the synchronizer 12 which is the master clock.

The echo signal representing the variable event in time is taken from the output side of the video amplifier 24, point B, and is applied to a video shaping circuit 40 and thereafter applied as one of the two inputs to a gate circuit 42, such as an AND gate. The other input to the gate circuit 42 is provided by the output from the gate width generator 38. Therefore, the echo signal processed by the video shaper 40 is permitted to pass through the gate circuit 42 only during the duration of the gating pulse signal provided by the circuit 32 while any other signal, such as a spurious echo, unless occurring within the period of the gating pulse signal, is rejected. The output from the gate circuit 42 is coupled via a delay circuit 44, whose function will be described later, to a bistable multivibrator circuit 46. This multivibrator is started, or set, upon the receipt of an output from the gate circuit 42 and is turned off, or reset, as a function of the lagging edge of the pulse gating signal originating at gate width generator 38 which is coupled to multivibrator 46 via a shaper circuit 48. The multivibrator, therefore, provides an output signal whose duration is equal to the time between the arrival of the echo responsive signal at the multivibrator 46 and the end of the gating signal provided by the gate width generator 38. Assuming that the width control 39 remains set, the duration of this output signal will vary with the motion of the object relative to the fixed reference, that is the pulse gating signal provided by the gate width generator 38.

The output from the bistable multivibrator 46, being a signal of a certain duration, is now coupled to a time duration-to-amplitude conversion circuit 48 which comprises essentially a saw-tooth generator 50 which provides a wave shape whose peak is proportional to the time span of the signal from the multivibrator, and a peak detector 52. Thus, there is obtained a signal whose amplitude corresponds to the width of the output signal from the multivibrator 46 and, hence, to the time span between the echo signal and the end of the time delayed pulse gating signal. The output from the peak detector 52 is coupled to a signal storage circuit 54, typically a diode-resistor-capacitance circuit which, in turn, provides via suitable impedance changing circuits (not shown) an input to a recording means 56, such as a graphic recording instrument having a time responsive driven recording tape 57. The recorder may be an instrument of the type used for cardiograms. The representation on the recording medium 57 is a signal indicating the motion of the explored object versus time whereby control 39 operates as a gain control for this presentation.

As has been described heretofore, provisions must be made to suppress excursions of the recording stylus or of similar indicating means during the absence or a temporary loss of the echo signal. This is accomplished by providing the signal storage means 54 with a long time constant relative to the signal pulsing rate and the retention of the preceding signal until the arrival of a new signal which is responsive to a signal derived under the identical circumstances. In a typical embodiment, the signal storage means has been designed to have a time constant of seven seconds which is exceedingly long with respect to the heretofore stated 200 cycle pulsing rate and, as a result thereof, the value or amplitude of the stored signal is retained substantially constant for a large number of cycles of the pulsing rate. As is well known from the electrical circuit theory, one time constant represents a drop of the signal to 37 percent of its original value, a value which theoretically in this example would be reached only after 1400 cycles, neglecting any inherent circuit leakage or loading. Actually, the 37 percent value will be reached earlier, but in the present application, the steady state conditions for which a "hold" is desired concerns only a few cycles.

Considering the present circuit, the signal received by the storage means 54 is maintained until the receipt of a succeeding output signal at the gate circuit 42, which signal actuates a reset switch 58 connected to the storage circui 54. Actuation of this switch briefly discharges the storage means, thereby conditioning or zeroizing the storage means 54 for acceptance of this new signal. The delay circuit 44, providing a delay of a fraction of a microsecond, permits operation of the reset switch prior to the arrival of the signal at the signal storage circuit 54. The reset switch, in the preferred example, comprises an electronic switching means adapted to temporarily establish a discharge circuit to ground, but it will be apparent that other reset switching means may be used. Likewise, the signal storage means 54 may take the form of any of the conventional storage circuits known in the art.

FIGURE 3 shows some of the signals and their relationship with respect to time and each other. The signal pulse 62 occurring typically at 200 cycles per second is started at time T–1. The time delayed gating pulse signal 64 provided by gate width generator 38 has a duration from time T–2 to T–6. The occurrence of the echo pulse 66 is depicted at time T–3. The echo pulse causes operation of the reset switch circuit 58, thereby discharging the signal 68 retained in the storage means 54. The echo pulse terminates at time T–4 and at time T–5, a brief moment thereafter as caused by the delay circuit 44, the multivibrator 46 and the saw-tooth generator 50 are actuated. The operation of the multivibrator is represented by signal line 70 and the wave shape at the output of the saw-tooth generator is shown by line 72. The end of the gating signal 64 shuts off the multivibrator 46 and terminates the rising output signal provided by the saw-tooth generator 50. At point T–6, the storage circuit is charged to a voltage level which represents the new signal.

For adjusting proper operation, only controls 35 and 39 are used. Control 35 is adjusted to place the echo signal within the time span of the pulse gating signal and control 39 operates as the gain control to adjust the relative amplitude of the recorded signal.

FIGURE 4 shows schematically a representation of the recordings obtained when exploring the human body with and without the use of the circuit shown in FIGURE 2. Curve 80 is generally a sine wave showing the reciprocating motion of an object relative to time. The peak to peak excursion of the signal represents motion relative to the transducer 18 in FIGURE 1. At 200 signal pulses per second and assuming that the explored object moves at one cycle per second, there will be 200 measurements taken for each cyclic motion of the object. Any loss of one or two consecutive echo signals manifests itself as a brief signal hold condition as shown by numerals 81, 82, and 83. In contrast therewith, curve 86 depicts a typical representation of the recorded signal in the absence of the above described circuit, clearly indicating the rather violent and irrelevant excursions and spurious signals at 87, 88, and 89.

While the circuit disclosed hereinbefore uses as the fixed or reference time event the termination of the gating signal provided by the gate width generator 38, it will be apparent that by a suitable modification of the circuit the beginning of the gating signal can be used as reference point as well as any other event fixed with respect to the initiation of the signal pulse.

While there has been described an illustrated a certain preferred embodiment of the invention, it will be apparent to those skilled in the art that various changes and modifications may be made therein without deviating from the broad principle and intent of this invention, which shall be limited only by the scope of the appended claims.

What is claimed is:

1. In an electro-acoustic exploring circuit which involves the periodic propagation of a signal pulse and the reception of a time delayed echo pulse in response to such signal pulse, the combination of:

a first circuit means for generating a pulse gating signal time delayed with respect to the signal pulse;

a gate circuit coupled to said first circuit means and adapted to receive the echo pulse for providing a first output signal responsive to the echo pulse and occurrence thereof during the existence of said gating signal;

a second circuit means coupled to said first circuit means and said gate circuit to provide a second output signal whose duration is substantially proportional to the time span from the receipt of said first output signal to the end of said pulse gating signal of said first circuit means;

a third circuit means coupled for receiving said second output signal and providing a third output signal whose amplitude is proportional to the duration of said second output signal;

a signal storage means coupled to receive said third output signal, and a reset means coupled to said storage means and to said gate circuit for conditioning said storage means in response to said first output signal.

2. An electro-acoustic exploring circuit as set forth in claim 1 wherein said signal storage means is provided with a time constant which is relatively long with respect to the pulse recurrence of the signal pulses to maintain the amplitude of said third output signal substantially constant for a plurality of cycles of the signal pulses.

3. In an electro-acoustic exploration circuit which involves the periodic propagation of signal pulses in the sonic or ultrasonic frequency range and the reception of time delayed echo pulses in response to such signal pulses, the combination of:

a first circuit means for generating a pulse gating signal time delayed with respect to the initiation of propagation of a respective signal pulse and terminating prior to the propagation of a next succeeding signal pulse;

a gate circuit coupled to said first circuit means and adapted to receive an echo pulse responsive to an associated signal pulse for providing a first output signal responsive to the echo pulse and the occurrence thereof during the existence of said gating signal;

a second circuit means coupled to said first circuit means and said gate circuit to provide a second output signal whose duration is substantially proportional to the time span from the receipt of said first output signal by said second circuit means to the end of said pulse gating signal;

a third circuit means coupled for receiving said second output signal and providing a third output signal whose amplitude is proportional to the duration of said second output signal;

a signal storage means coupled to receive said third output signal, and said storage means having a time constant which is relatively long with respect to the time between two consecutive signal pulses whereby to temporarily maintain, in the absence of one or more successive echo pulses, the amplitude of said third output signal substantially constant for several cycles of said signal pulses, and a reset means coupled to said storage means and to said gate circuit and actuated in response to said first output signal for zeroizing said storage means.

4. An electro-acoustic exploration circuit as set forth in claim 3 and including a visual display device coupled to said signal storage means for receiving and displaying said third output signal.

5. An electro-acoustic exploration circiut as set forth in claim 3 and including a visual display device coupled to said signal storage means for receiving and displaying said third signal along one axis and time along a second axis.

6. An electro-acoustic exploration circuit as set forth in claim 5 wherein said display device is a recording instrument providing a graphic record.

7. An electro-acoustic exploration circuit as set forth in claim 3 and including a pulse delay circuit disposed to delay the receipt of said third output signal by said signal storage means until actuation of said reset means.

8. An electro-acoustic exploration circuit as set forth in claim 3 and including a pulse delay circuit disposed to delay the receipt of said third output signal by said signal storage means until said reset means has zeroized said storage means.

9. An electro-acoustic exploration circuit as set forth in claim 3 and including control means for adjusting the initiation and termination of said pulse gating signal.

10. In an electro-acoustic exploration circiut which involves the periodic propagation of signal pulses in the sonic or ultrasonic frequency range and the reception of time delayed echo pulses in response to such signal pulses, the combination of:

a first circuit means which includes a sonic pulse generator and at least one transducer for generating and propagating acoustic signal pulses in a body and for receiving therefrom time delayed echo pulses in response to such signal pulses;

a pulse gating circuit coupled to said first circuit means for providing a gating pulse in response to each signal pulse, said gating pulse being time delayed with respect to such signal pulse and having an adjustable time span;

an AND gate circuit coupled to receive said delayed gating pulse and the echo pulse, both responsive to a respective signal pulse, and providing a first output signal in response to the receipt of said echo pulse during the time span of said gating pulse;

a multivibrator coupled to said AND gate circuit and to said pulse gating circuit for receiving said first output signal and a signal denoting the end of said time span, whereby to provide a second output signal whose duration is responsive to the receipt of said first output signal and the end of said time span;

a time to amplitude conversion circuit coupled to receive said second output signal and providing a third output signal whose amplitude is proportional to the duration of said second output signal;

a signal storage means coupled to said conversion circuit for receiving said third output signal, and said storage means being characterized by having a relatively long time constant with respect to the time interval between two consecutive signal pulses to cause said storage means to maintain the amplitude of said third output signal substantially constant for several cycles of the signal pulses in the absence of an echo pulse normally resulting from an immediately succeeding signal pulse;

a reset means coupled to said storage means and said AND gate circuit for normalizing said storage means in response to the occurrence of said first output signal while in the absence of said first output signal leaving said storage means maintained responsive to a previous signal amplitude, and a recording means coupled to said storage means for recording a value commensurate with the amplitude of said stored signal relative to time.

11. An electro-acoustic exploration circuit as set forth in claim 10 wherein signal delay means are interposed to cause said reset means to zeroize said signal storage means prior to the receipt therein of said third output signal.

12. An electro-acoustic exploration circuit as set forth in claim 10 wherein said conversion circuit includes a sawtooth generator and a peak detector, and said stored signal is a direct current signal.

13. A method for investigating the motion of a movable object within a body by electro-acoustic exploration involving the cyclic generation and sending of a signal pulse and the receipt of a time variable echo pulse, comprising the steps of:

(a) cyclically generating an acoustic signal pulse and sending it into the body;

(b) setting the occurrence of a fixed event correlated with the generation of a respective signal pulse;

(c) sensing the receipt of an echo pulse returned from the object, said echo pulse being responsive to said signal pulse being intercepted by said object;

(d) providing an output signal whose amplitude is proportional to the time between said fixed event and the receipt of said echo pulse, and (e) maintaining the value of said output signal substantially constant until the arrival of a cyclically succeeding output signal and, in the absence of a succeeding output signal, maintaining the value of said signal substantially constant for a period of time extending over several cycles of said cyclically generated signal pulse.

14. A method for investigating the motion of an object within a living body by the electro-acoustic exploration method which involves the periodic propagation of spaced signal pulses in the sonic or ultrasonic frequency range within the living body and the reception of time delayed echo pulses in response to such signal pulses, comprising the steps of:

(a) cyclically sending an acoustic signal pulse into the body and searching for an echo pulse in response to each such signal pulse;

(b) establishing a time interval delayed with respect to the time of sending each respective signal pulse;

(c) determining the receipt of an echo pulse responsive to an associated signal pulse within such time interval;

(d) providing an output signal whose value is responsive to the time span between the receipt of said echo pulse and a point in time fixed relative to said interval;

(e) maintaining the value of said output signal substantially constant until the receipt of a new output signal resulting from the next-succeeding signal pulse and its associated echo pulse, and (f) in the absence of a new output signal resulting from the next-succeeding signal pulse and its associated echo pulse maintaining the value of such previous output signal substantially constant until the receipt of a subsequent output signal occurring within a predetermined period of time.

15. An electro-acoustic exploration method as set forth in claim 14 and including the step of recording the value of said output signal.

16. An electro-acoustic exploration method as set forth in claim 14 and including the step of terminating said interval before the sending of a next succeeding pulse.

17. An electro-acoustic exploration method as set forth in claim 14 wherein the value of said output signal is responsive to the time span between the receipt of said echo pulse and the time remaining in said interval.

18. A method for investigating the motion of a movable object within a living body by electro-acoustic exploration involving the periodic propagation of spaced signal pulses in the sonic or ultrasonic frequency range within such body and the reception of delayed echo pulses in response to such signal pulses, comprising the steps of:

(a) cyclically sending an acoustic signal pulse from the surface of the body thereinto toward the moving object therein and searching for an echo pulse from such object in response to each signal pulse;

(b) establishing a time interval whose starting point is delayed with respect to the time of sending each respective signal pulse and terminating such interval before the sending of a next-succeeding signal pulse;

(c) determining the receipt of an echo pulse responsive to an associated signal pulse within such time interval;

(d) providing an output signal whose amplitude is responsive to the time span between the receipt of said echo pulse and the time remaining in said time interval;

(e) maintaining the amplitude of said output signal substantially constant until a succeeding such output signal and for a predetermined period of time in the event of the absence of an echo pulse normally resulting from the succeeding signal pulses, and (f) providing a record of the amplitude of successive output signals versus time, which record is a measure of distance versus time of said object within said body.

19. A circuit for electro-acoustic exploration involving the periodic propagation of signal pulses and the reception of time delayed echo pulses responsive to said signal pulses comprising:

first electrical circuit means for passing an echo pulse during a predetermined time interval which is delayed with respect to an associated signal pulse;

second electrical circuit means coupled to said first circuit means for producing an output signal whose value is responsive to the span of time between the passing of an echo pulse and a point in time fixed relative to said time interval;

signal storage means coupled to said second electrical circuit means for receiving and storing a signal whose amplitude is responsive to the value of said output signal and said signal storage means having a time constant with respect to the pulse recurrence of the signal pulses to store said signal without a material degradation for several cycles of said periodically propagated signal pulses, and reset means coupled to said storage means and said first electrical circuit means for conditioning said storage means responsive to the passing of the echo signal by said first electrical circuit means.

20. A circuit as set forth in claim 19 and including signal delay means coupled between said first and second circuits for enabling conditioning of said storage means immediately preceding the receipt of a signal therein.

21. An electro-acoustic circuit as set forth in claim 19 and including signal delay means coupled between said first and second electrical circuit means for enabling zeroizing of said storage means immediately preceding the receipt of a signal therein, and said point in time being the end of said predetermined time interval.

References Cited

UNITED STATES PATENTS

| 3,156,110 | 11/1964 | Clynes | 73—67.8 |
| 3,238,767 | 3/1966 | Clynes | 73—67.9 |
| 3,256,733 | 6/1966 | Carlin | 73—67.8 |
| 3,292,018 | 12/1966 | Clynes | 310—8.1 |
| 3,309,913 | 3/1967 | Weighart | 73—67.8 |
| 3,310,049 | 3/1967 | Clynes | 128—2.05 |

RICHARD A. GAUDET, *Primary Examiner.*

SIMON BRODER, *Examiner.*